United States Patent

[11] 3,619,233

[72] Inventors Julius Carl Hipp
Elm Grove;
James Arthur Schmidt, Brookfield, both of Wis.

[21] Appl. No. 804,987
[22] Filed Mar. 6, 1969
[45] Patented Nov. 9, 1971
[73] Assignee Globe-Union Inc.
Milwaukee, Wis.

[54] METHOD OF METALLIZING A CERAMIC MEMBER
11 Claims, No Drawings

[52] U.S. Cl. .......... 117/22, 117/25, 117/45, 117/123 A, 117/160 R, 117/212, 117/217, 117/227, 117/71 R
[51] Int. Cl. .......... B44d 1/16, C03c 17/08
[50] Field of Search .......... 117/71, 217, 227, 123 A, 45, 212, 16 OR, 22, 25

[56] References Cited

UNITED STATES PATENTS

| | | | |
|---|---|---|---|
| 3,497,384 | 2/1970 | Pirigyi | 117/160 |
| 3,401,126 | 9/1968 | Miller et al. | 117/227 |
| 3,186,863 | 6/1965 | Foley | 117/45 |
| 2,876,139 | 3/1959 | Flowers | 117/160 R |
| 2,776,472 | 1/1957 | Mesick | 117/123 B |

*Primary Examiner*—Alfred L. Leavitt
*Assistant Examiner*—M. F. Esposito
*Attorneys*—John Phillip Ryan, Glenn A. Buse and Denton & Terry

ABSTRACT: A thick, solderable metallic coating is provided on a ceramic member by applying a metallic composition comprised of at least 10 weight percent, preferably at least 30 weight percent, of powdered molybdenum trioxide, or tungsten trioxide, or mixtures thereof, and at least 30 weight percent of powdered gold, or copper, or silver, or alloys thereof, on the surface of the member and then firing the coated member in a wet reducing atmosphere at a temperature above the melting point of the solderable material to substantially reduce the molybdenum trioxide and/or tungsten trioxide to the metallic form. In one embodiment, the molybdenum trioxide and/or tungsten trioxide is applied to the surface of the ceramic member first and gold, copper, silver, or alloys thereof, is then applied over this first coating. In another embodiment, the metallic composition is applied to the ceramic member as an admixture.

METHOD OF METALLIZING A CERAMIC MEMBER

BACKGROUND OF THE INVENTION

1. Field of the Invention

This invention relates to metallizing ceramics. In another aspect, this invention relates to an improved method for applying metallic coatings on a ceramic member which are suitable for the fabrication of hybrid integrated electronic circuit assemblies and the article produced thereby.

2. Description of the Prior Art

There are several known processes for metallizing ceramic members which utilize molybdenum or tungsten as a coating composition. Most of these processes, developed primarily for applications in the vacuum tube art, require either multiple firing steps, a plating step, or various additional metallic constituents in the coating composition in order to obtain a metallic coating adaptable to soldering or brazing. Ever-increasing applications for metallized ceramics are being found in the electronics industry, especially in the field of printed microelectronic circuits. In many of these applications, the metallic coating must be solderable or brazable. The industry is constantly seeking simplified methods for providing a tightly adhering metallic coating capable of being soldered or brazed in an attempt to minimize overall fabrication costs.

Recently, in the electronic component packaging art, considerable work has been directed to developing various hybrid integrated circuit units in an effort to meet the increasing demand for highly complicated logic circuits in compact form for use in both commercial and military devices. One type of widely used hybrid units includes a ceramic substrate having patterned metallic coatings formed on at least one surface thereof to provide one or more discrete electrical circuits to which miniature electronic components, such as transistors, diodes, resistors, condensers, capacitors, etc., frequently in the form of chips, are attached.

Hermetically sealed modules commonly are formed by bonding a cover member, made of such materials such as ceramic, procelain, glass, various metal alloys (such as a nickel-cobalt-iron alloy metal sold under various trade names, e.g., Kovar) etc., to the circuit-bearing substrate. The hermetic seal is designed to exclude air or other gases, moisture dust and other deleterious matter from reaching the electronic components, while at the same time, assuring that the components will ultimately perform their intended function. The ceramic substrate usually has a peripheral metallized portion on its surface to which the cover member is bonded.

Because of the various fabrication steps and operating requirements of hybrid integrated circuit units, and other similar electronic assemblies, the metallic coating used for the discrete circuits and/or sealing portions on a ceramic substrate must fulfill certain criteria. The most important of these criteria are: (1) high bond strength to the ceramic, (2) good solderability with a wide variety of soldering materials, (3) good brazability with a wide variety of brazing alloys, (4) high electrical conductivity, (5) capability of forming a hermetic seal, (6) compatibility with semiconductive materials so that there is no deleterious interaction between the coating and the semiconductor when the latter is fused thereto, (7) capability of withstanding the subsequent severe chemical treatment and physical handling steps of the module fabrication process, (8) bondability with extremely fine wire, such as gold and aluminum wire, widely used to interconnect the components, (9) capability of being bonded to cover members by thermocompressive or ultrasonic welding and other conventional bonding techniques, (10) nonmigratory, and preferably (11) capability of application by a single firing step. It can be readily appreciated that a metallic coating capable of fulfilling all of these criteria could be used somewhat universally for a wide variety of electronic system applications.

For most practical purposes, fulfillment of the above criteria requires that the outer surface of the coating be of high-purity gold. Several techniques have been proposed for applying gold-coated printed circuits on a ceramic substrate.

In one process, a refractory metal paint composition, usually containing primarily powdered molybdenum and manganese, is screen printed, or otherwise applied, onto at least one surface of a ceramic substrate in an arrangement generally conforming to the desired final pattern. The patterns are interconnected for a subsequent electroplating step. The ceramic member is then fired in a wet reducing atmosphere to bond the metal powder onto the substrate and gold is subsequently electroplated over the metallic coating. The member is then fired once more to sinter the gold coating to the refractory metal and make it readily solderable and/or brazable. The interconnecting portions of the patterns are removed by chemical or mechanical means to isolate them into discrete circuits.

In another process, a refractory metal paint composition is applied to the entire surface of a ceramic member and the member is fired in a wet reducing atmosphere to bond the metal powder onto the substrate. Masking is then applied to the metal-coated surface of the member, such as by the conventional photoresist technique, at those locations where electrical isolation is desired and gold is then electroplated over the unmasked surfaces. The masking and metallic coating thereunder is then removed and the member is subsequently fired in a wet reducing atmosphere to adhere the gold coating.

In a further process, a gold paint composition containing vitreous material is painted onto the surface of the ceramic member in the desired pattern and the member is fired in an appropriate atmosphere.

Although acceptable for some applications, these prior art methods have several disadvantages. In addition to the time and expense associated with the multiple steps of the first-mentioned process, the gold coating provided thereby is quite thin and is degraded considerably when subjected to the rather severe environment of the various chemical and physical treatment steps and firing atmospheres of the module fabrication process. Frequently, the gold coating is dissolved completely or degraded during the soldering or brazing required for mounting some types of electronic components and/or hermetic sealing. Hence the metallic coating provided by this process has limited applications. Also, the gold coating inherently contains some residual chemical impurities on the surface from the electroplating bath which interferes with the bonding of solder or brazing materials thereto and may interact with a semiconductive material attached thereto.

In addition to the same general disadvantages of the first-mentioned process, the second process involves even further expensive and time-consuming steps.

The coating provided by the third process, even though requiring only a single firing step, has poor bond strength, has limited ability to endure an exposure to molten solder and brazing alloys because the gold dissolves quite rapidly, is not readily adaptable for bonding of extremely fine wires with good electrical contact because of the presence of interspersed glass, has limited ability to withstand some chemical treatments because of the chemical liability of glass and, generally, is not solderable.

SUMMARY OF THE INVENTION

One object of this invention is to provide an improved, simplified method, and the article produced thereby, wherein a tightly-adherent, solderable metallic coating is applied to a ceramic member. Another object of this invention is to provide a method for obtaining a thick, high-purity gold coating in patterned form on a ceramic member which is adaptable to a wide variety of electronic components, including semiconductive devices, and has good soldering and brazing characteristics. A further object of this invention is to provide a method for forming such a coating on a ceramic member with a single firing step.

According to this invention, a metallic composition comprising at least 10 weight percent, preferably at least 30 weight percent, of a refractory metal oxide selected from the group consisting of molybdenum trioxide, tungsten trioxide, or a mixture thereof, and at least 30 weight percent of a solderable material selected from the group consisting of gold, copper, silver and alloys thereof, is applied to at least one surface of a ceramic member and the ceramic member is subsequently fired in a wet reducing atmosphere at a temperature above the melting point of the solderable material to substantially reduce the refractory oxide(s) to metallic form and produce a thick, tightly-adhering metallic coating on the ceramic member. When an admixture of molybdenum trioxide and tungsten trioxide is used as the refractory metal oxide, the composition of the admixture is preferably about 60 to about 90 weight percent tungsten trioxide and about 10 to about 40 weight percent molybdenum trioxide, based upon the total weight of the refractory metal oxides.

In accordance with one embodiment of this invention, the refractory metal oxide(s) is applied to the ceramic member first and the solderable material is applied over this first coating. In accordance with another embodiment, the refractory metal oxide(s) and the solderable material are admixed and applied as an admixture.

DESCRIPTION OF THE PREFERRED EMBODIMENTS

In accordance with a preferred embodiment, a suspension of powdered molybdenum trioxide or tungsten trioxide, or an admixture thereof (molybdenum trioxide being the most preferred) is first applied to the surface of a ceramic member in a desired pattern. After the first coating is dried, a suspension of powdered gold is applied over the first coating and is allowed to dry. The double-coated ceramic member is then fired in a wet reducing atmosphere, such as a hydrogen atmosphere, to substantially reduce the molybdenum trioxide and/or tungsten trioxide to the metallic form thereby producing a thick, tightly-adhering metallic coating in a desired pattern on the ceramic member. It has been found that the gold coating provided by this simplified, one-step firing method has a bond strength generally equal to or greater than the intrinsic strength of the ceramic member and has excellent soldering and brazing characteristics. Hence, a metallized ceramic article produced by this preferred embodiment can be used for a wide variety of electronic system applications.

Although not an essential feature of this invention, various conventional additives, such as compounds of nickel, manganese, cobalt, vanadium, chromium, iron, beryllium, titanium, niobium and the like, can be used in the metallic composition.

The powdered refractory metal oxide(s) and solderable material may be applied to the ceramic member in any convenient way. Preferably, they are applied as a suspension composed of the materials in powder form and a liquid vehicle comprising a solvent and a suitable organic binder. The suspension is applied to the ceramic member by any conventional method, such as screen printing, brushing or spraying. In the preferred embodiment, the coating of refractory metal oxide(s) is applied to the ceramic member in the desired pattern, so screen printing is preferred for this coating.

When the two coating method of this invention is used, it is not necessary for the second coating of solderable material to be applied in a pattern even though a pattern of final metallic coating is desired. Preferably, the solderable material is applied to substantially the entire surface of the ceramic member. During the firing step, the solderable material melts and forms a meniscus about the patterned first coating thereby precluding the necessity of any alignment of the second coating or further treatment to remove excess material in order to obtain electrical isolation. This meniscus effect of the molten solderable material produces a thick coating of same over the first coating upon cooling.

The process of this invention is adaptable to any substrate of insulating ceramic material which is not detrimentally affected by a wet reducing atmosphere at elevated temperatures. Generally, fired dense or vitreous refractory bodies formed from ceramic-type materials capable of being subjected to this environment can be used, such as alumina (including high-purity alumina), beryllia, steatite, forsterite, cordierite, synthetic single crystal sapphire, and the like. Since this process utilizes a wet reducing atmosphere for firing, reducible materials such as most titanates, cannot be used. If desired, the essential features of the process of this invention can be used to metallize nonvitreous or porous ceramic bodies.

The surface of the ceramic body which is to be metallized must be chemically clean, i.e., free from grease, foreign marks, etc. Suitable cleaning can be accomplished by washing the fired ceramic member with a detergent, acetone, or other conventional cleaning agents. After cleaning, the clean ceramic article is handled by means designed to keep it clean and free of grease. Glazes are generally avoided on the surfaces to which the coating is to be applied. If glaze is used on other portions of the ceramic member, it must be stable and refractory in the firing atmosphere of this process, and in the types and at the temperatures of any firing atmosphere of subsequent module fabrication.

The particle size of the refractory metal oxide(s), solderable material, and additives, if used, is not particular critical. They should be in fine powdered form, generally having a particle size smaller than approximately 20 microns with the preferred average particle size of the refractory metal oxide(s) and the solderable materials being in the range of 2 to 10 microns.

The vehicle used to form the suspension should become completely volatilized in the reducing atmosphere of the firing step. This volatilization during firing should occur in a controlled or nonviolent fashion so that bubbles or voids are not formed in the resultant coating. Neither the solvent or binder should have any substantial residue, especially a carbonaceous residue, after firing and should not react with metallic constituents of the coating compositions or the ceramic member.

Representative examples of suitable solvents include benzene, the esters of fatty acids and alcohols of low molecular weight, such as ethyl, butyl, amyl acetate, aromatic and aliphatic solvents, such as xylene and hexane, ketones, such as acetone and butanone, and higher ethers such as glycol diethyl either, diethyl carbitol and butyl carbitol acetate with butyl carbitol acetate being preferred.

Representative examples of suitable organic binders include isobutyl methacrylate (particularly that sold under the trade name Lucite), cellulose esters and ethers, such as cellulose nitrate, cellulose acetate, cellulose butyrate, methyl cellulose and ethyl cellulose with isobutyl methacrylate and ethyl cellulose being preferred.

The binder is dissolved in the solvent and the finely divided powders are added to the solution by milling in an automatic mortar or three roll mill. The blending is continued until a uniform suspension is obtained. The viscosity of the suspension can be adjusted to the desired consistency for the particular technique utilized for application to the ceramic member by adding more solvent. It may be desirable to add amounts of a gelling agent to the solution to insure thixotropy when the suspension is applied to the ceramic member.

The coating compositions should be coated onto the ceramic member in a smooth uniform layer. As indicated above, the first coating is preferably applied by screen printing in a pattern conforming to that desired on the final product. This may be in the form of several electrically isolated portions for mounting components, as well as a peripheral pattern for forming a hermetic seal with a cover member. Base plates for several electrical assemblies can be formed simultaneously on one ceramic member which is then divided into individual units by a subsequent processing step.

When the double coating technique is utilized, the thickness of the first coating would generally be in the range of about 0.5 to 3.0 mils, although it can be made even thicker by multiple applications after allowing the vehicle to dry between each application. After each coating application, the ceramic member is dried for a sufficient time so that at least the majority of the solvent has evaporated. If desired, the drying can be accelerated by placing the coated ceramic member in an air oven for a few minutes at a relatively low temperature, for instance about 300° F.

When the double coating technique is being used, the solderable material is applied over the first coating after drying. The solderable material is preferably applied over the entire surface of the ceramic member in a uniform layer in sufficient amount so that the total thickness of the two layers is at least about 1.0 mil. As with the first coating, this coating can be made thicker by multiple applications with the coating being allowed to dry between each application.

The dried, coated ceramic member is then placed in a suitable firing device, such as an oven, in a wet reducing atmosphere, preferably hydrogen or dissociated ammonia, and fired at a temperature above the melting point of the solderable material. Generally, a temperature in the range of 1,700° to 2,500° F. is preferred with a temperature about 2,000° F. being most preferred. During the firing step, the molybdenum trioxide and/or tungsten trioxide is substantially reduced to its metallic form. The time for heating is dependent upon the type of secondary additives, if any, in the coating composition and the specific temperature used. Generally, a time at temperature of 1 to 30 minutes will be acceptable. It has been found that when the double coating technique is used with molybdenum trioxide as the sole component of the first coating, a time of about 5 minutes at a peak temperature of about 2000° F. produces the best results.

Of course, the thickness of the final metallic coating is dependent upon the thickness of the coating(s) applied; however, the total thickness is preferably at least 0.3 mil. A final coating having at least this minimum thickness has been found to give the best results when the metallized ceramic member is subjected to the vigorous fabrication steps of hybrid integrated circuit modules.

The following examples are presented to illustrate this invention and are not to be construed as limitations thereto.

EXAMPLE I 327 grams of molybdenum trioxide were milled in the presence of 250 ml. of acetone in a one-quart mill jar with 600 grams of ½-inch diameter ceramic balls for 4 hours and then dried to remove the acetone. Eighty grams of the molybdenum trioxide were then blended with 20 grams of a vehicle comprising 2 parts of butyl carbitol acetate and one part isobutyl methacrylate (Lucite), 2 grams of petroleum ether and four drops of Triton (a wetting agent). The resulting suspension was screen painted onto both sides of 25 small circular disks of 95 percent alumina ceramic. After this first coating was air dried, a gold suspension, made by blending 80 grams of gold powder with 20 grams of the above vehicle, was screen painted over the first coating and the double-coated disks were then dried in an air oven at a temperature of approximately 300° F. The dried disks were then fired in a wet dissociated ammonia atmosphere at various peak firing temperatures for the same length of time, 5 disks at each firing temperature. After cooling, steel terminals were soldered to both surfaces of each disk with a 40/60 lead-tin eutectic alloy soldering material. The bond strength of the coating on each disk was determined by mounting the two terminals in a jig which applied a tensile load thereto. The metallized coating did not peel away from the ceramic in any of these tests. The average tensile load at fracture and the type of fracture for the disks at the various firing temperatures were as follows:

TABLE I

| Firing Temp., °F. | Average Tensile Force p.s.i. | Type of Fracture |
|---|---|---|
| 2,000 | 9,790 | 1. |
| 2,050 | 9,500 | 2. |
| 2,100 | 9,460 | 2. |
| 2,150 | 10,100 | 3. |
| 2,250 | 6,500 | 3 |

1. Fracture in solder-steel bond
2. Some fractures in the solder-steel bond, others were at ceramic interface, i.e., included portions of the ceramic torn away
3. Fracture included portions of ceramic torn away These results show that a metallic coating having an excellent bond strength can be obtained by the process of this invention when molybdenum trioxide is used as sole active material.

EXAMPLE II

A metallic mixture comprising 327 grams of molybdenum trioxide, 6.75 grams of Titania and 0.25 grams of cuprous oxide was ball milled in the presence of 250 ml. of acetone for 4 hours and then air dried to remove the acetone. Two hundred forty grams of the resulting admixture were blended with 60 grams of a vehicle containing equal parts of isobutyl methacrylate (Lucite) and a high boiling ethyl xylene solvent to form a homogeneous suspension. A portion of the suspension was screen painted onto both surfaces of eight small circular disks of 95 percent alumina ceramic. After air drying, a second suspension comprising 80 weight percent powdered gold and 20 weight percent of a vehicle containing equal parts of ethyl cellulose and butyl carbitol acetate was screen painted over the first coating. The double-coated disks were air dried and then fired in a wet dissociated ammonia atmosphere, three at a peak temperature of 2,040° F. for 15 minutes and five at a peak temperature of 2,000° F. for 15 minutes. Steel terminals were soldered to the disk and the bond strength of the coatings determined in the same manner as in example I. The average tensile force at fracture was 10,010 p.s.i. for the first three disks and 9,702 p.s.i. for the latter five disks.

These results show that conventional additives in minor proportions can be admixed with the refractory metal oxides without appreciable affecting the bond strength of the resultant coating. In some applications, the use of such additives in a minor amount may be found to be desirable because of a particular coating application technique used.

Tests have also been performed where powdered gold was admixed with the refractory metal oxide(s) and a coating applied in a single painting step. The metallized layer produced by this technique was found to be suitable for many applications where a thick, high-purity gold overcoating is not required. For those applications where such a gold overcoating is required this particular technique would not be acceptable, since the gold is interspersed with the reduced refractory metal oxide(s) rather than being in the form of a thick layer on top of the coating.

EXAMPLE III

Several small ceramic disks, made of both 95 percent and 99.6 percent alumina, were metallized and tested in substantially the same manner as example II, except that molybdenum trioxide, tungsten trioxide, and mixtures of molybdenum trioxide and tungsten trioxide were used as the powder of the first coating. Results of these tests were as follows:

TABLE II

| Ceramic type, percent $Al_2O_3$ | Comp. of 1st coat | Firing temp., (° F.) | Approx. time at firing temp. (min.) | Average tensile force at fracture (p.s.i.) |
|---|---|---|---|---|
| 99.6 | $MoO_3$ | 2,030 | 6 | 10,650 |
| 95 | $MoO_3$ | 2,030 | 6 | 10,280 |
| 99.6 | $WO_3$ | 2,040 | 6 | 4,600 |
| 95 | $WO_3$ | 2,040 | 6 | 8,500 |
| 95 | 75 wt. percent $WO_3$; 25 wt. percent $MoO_3$ | 2,020 | 6 | 7,950 |
| 99.6 | 80 wt. percent $WO_3$; 20 wt. percent $MoO_3$ | 2,030 | 6 | 4,660 |
| 95 | 80 wt. percent $WO_3$; 20 wt. percent $MoO_3$ | 2,030 | 6 | 6,740 |

These results show that coatings having excellent bond strengths can be obtained when either molybdenum trioxide, tungsten trioxide, or mixture thereof is used as the refractory metal oxide. This is particularly noteworthy because, heretofore, it has been thought that certain additives, such as manganese, ruthenium, iron, cobalt, and nickel, must be admixed with molybdenum, tungsten, or the oxides thereof in order to obtain an acceptable bond to a ceramic. The reasons for this excellent bonding without a wetting agent are not fully understood. It has been observed that the liquid solderable material readily penetrates the refractory metal oxide and becomes integrated with the ceramic-bonded matrix of the reduced refractory metal oxide during the firing step.

EXAMPLE IV

Tests have been performed similar to those in examples I and II using the same first coatings and a second coating containing powdered copper or silver in place of gold in a similar suspension. Coatings having bond strength, determined in the same manner as in examples I and II, as high as approximately 7,200 p.s.i., as well as good solderability characteristics have been obtained with these solderable metals. From these results it can be seen that, for applications where high-purity gold is not required, such as where a ceramic circuit-bearing member is used for mounting capacitors, resistors, etc., a metallic coating having excellent bond strength and soldering characteristics can be obtained in accordance with one embodiment of this invention.

From the above description of this invention, it can be readily appreciated that the mounting of some components and the formation of the metallic coating can be performed simultaneously during the firing step. For instance, external electrical leads can be juxtapositioned on the dried coating prior to firing and will be bonded therewith during the firing step. Many other similar types of simultaneous mounting techniques can be employed without departing from the spirit and scope of this invention.

We claim:

1. A method of metallizing the surface of a ceramic member comprising applying to said surface a first coating comprising a powdered refractory metal oxide selected from the group consisting of molybdenum trioxide, tungsten trioxide, and mixtures thereof; applying a second coating over said first coating comprising a powdered solderable material selected from the group consisting of gold, copper, silver, and alloys thereof; and heating said thus coated member in a wet reducing atmosphere to a temperature above the melting point of said solderable material to substantially reduce said refractory metal oxide to metallic form and form a tightly adhering metallic coating on said surface which is capable of being soldered.

2. The method according to claim 1 wherein both said refractory metal oxide and said solderable material are suspended in a volatile vehicle and said coated member is dried after each coating step.

3. The method according to claim 2 wherein said refractory metal oxide is molybdenum trioxide.

4. The method according to claim 2 wherein said refractory metal oxide is an admixture of molybdenum trioxide and tungsten trioxide comprised of about 10 to about 40 weight percent molybdenum trioxide and about 60 to about 90 weight percent tungsten trioxide.

5. The method according to claim 3 wherein said solderable material is gold.

6. The method according to claim 4 wherein said solderable material is gold.

7. A method for forming a solderable gold coating arranged in a predetermined pattern on the surface of a ceramic member comprising applying to said surface a first coating consisting essentially of a powdered refractory metal oxide selected from the group consisting of molybdenum trioxide, tungsten trioxide and mixtures thereof, in a volatile liquid vehicle in said predetermined pattern; drying the thus coated member; applying over said first coating a second coating consisting essentially of powdered gold in a volatile liquid vehicle; drying the thus doubled-coated ceramic member; and heating said double-coated member in a wet reducing atmosphere to a temperature at least as high as the melting point of said gold to substantially reduce said refractory metal oxide to metallic form and form a tightly adhering solderable gold coating substantially conforming to said predetermined pattern.

8. The method according to claim 7 wherein said refractory metal oxide is molybdenum trioxide.

9. The method according to claim 7 wherein said refractory metal oxide is an admixture of molybdenum trioxide and tungsten trioxide comprised of about 10 to about 40 weight percent molybdenum trioxide and about 60 to about 90 weight percent tungsten trioxide.

10. The method according to claim 7 wherein said coated member is maintained at said temperature for 1 to 30 minutes.

11. The method according to claim 8 wherein said coated member is heated to about 2,000° F. for about 5 minutes.

* * * * *